Dec. 7, 1937.   J. G. HOFF   2,101,582
OVEN LINING
Filed Feb. 17, 1936   2 Sheets-Sheet 1

INVENTOR.
John G. Hoff
BY
ATTORNEY.

Dec. 7, 1937.   J. G. HOFF   2,101,582
OVEN LINING
Filed Feb. 17, 1936   2 Sheets-Sheet 2
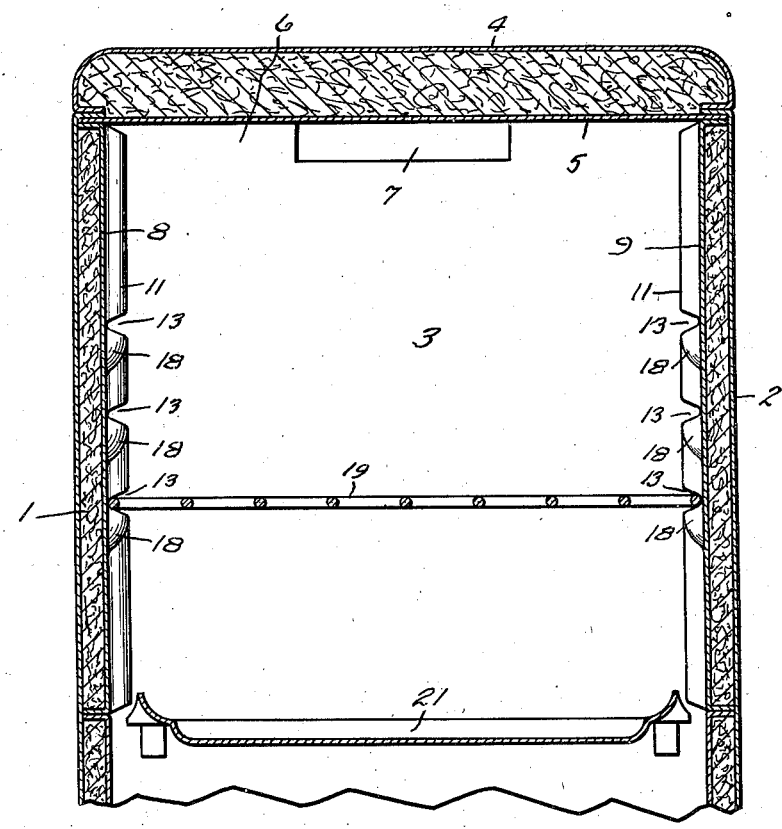
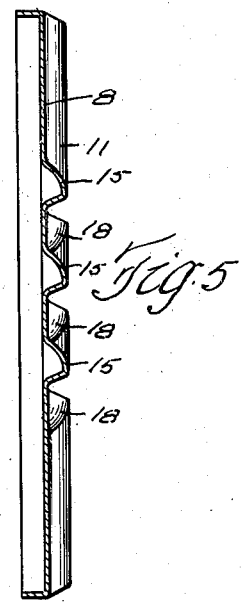
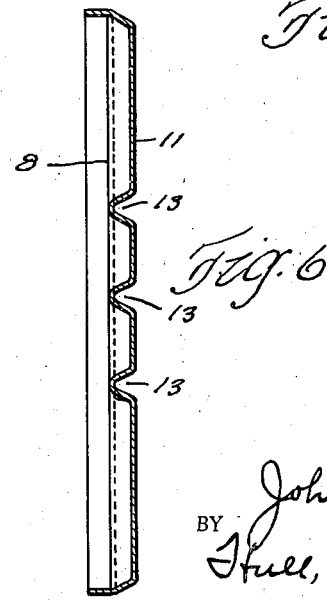
INVENTOR.
John G. Hoff
BY
Hull, Brock olbert
ATTORNEY.

Patented Dec. 7, 1937

2,101,582

UNITED STATES PATENT OFFICE 2,101,582

OVEN LINING

John G. Hoff, Mansfield, Ohio, assignor to The Tappan Stove Company, Mansfield, Ohio, a corporation of Ohio Application February 17, 1936, Serial No. 64,199

5 Claims. (Cl. 211—143)

This invention relates primarily to linings for ovens of a heat insulated gas range although the particular structure disclosed may be applicable to any compartment designed to support a rack or shelf.

The main object of the invention is to provide oven side linings for gas ranges which are constructed of one piece of metal and which have formed integral therewith projections which are stamped from the metal of the walls to form supports for racks or shelves, the projections being so disposed and arranged as to prevent tilting of the rack or shelf when partially removed. It is old in the art to provide oven linings which have grooves or corrugations therein to receive the shelf. It is also old to provide an oven lining having elongated bulges or ribs for the same purpose; but it has been impractical or at least an exceedingly difficult forming operation to place two of these ribs sufficiently close together that the rack or shelf will not tilt when partly withdrawn from the oven and deep enough to support the shelf or rack.

With my improved construction I provide a plurality of rows of spaced bosses or projections which can be stamped from the metal of the walls in a single operation and which provide a non-tilting shelf support. Another advantage of my construction is that I provide a support for the shelf without breaking the steel in the oven liner as it is not practical to have the insulating material behind the liner exposed to the products of combustion.

Figure 1:
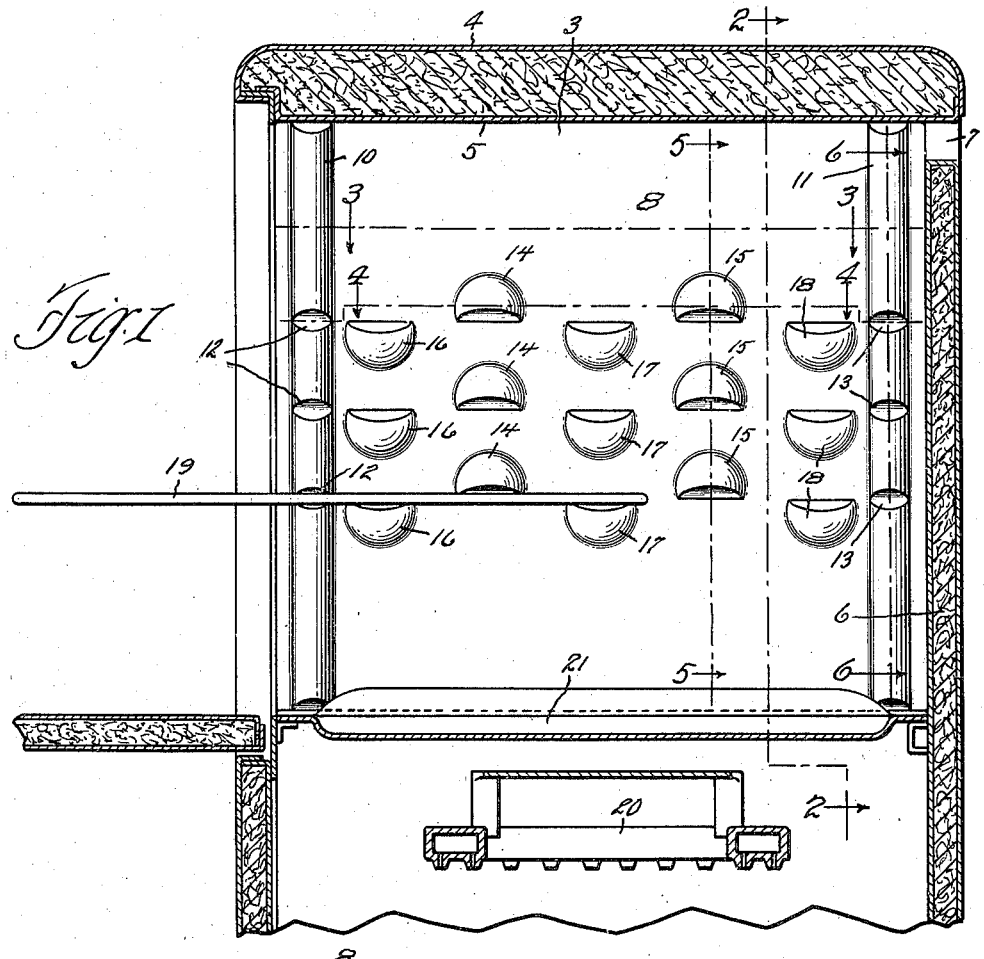
Figure 3:
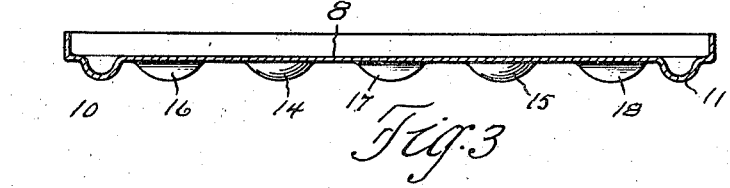
Figure 4:
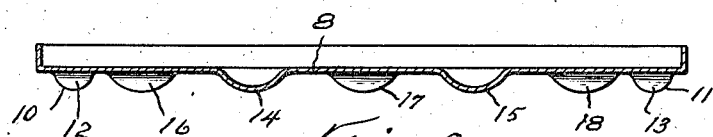

Further and more limited objects of my invention will appear as the description proceeds and by reference to the accompanying drawings in which Fig. 1 is a fragmentary sectional view of a range having my improved oven liner; Fig. 2 is a fragmentary sectional view taken on the line 2—2 of Fig. 1; Fig. 3 is a sectional view of one of the oven liners taken on the line 3—3 of Fig. 1; Fig. 4 is a similar view taken on the line 4—4 of Fig. 1; Fig. 5 is a similar view taken on the line 5—5 of Fig. 1; and Fig. 6 is a similar view taken on the line 6—6 of Fig. 1.

In the accompanying drawings, the reference characters 1 and 2 designate the outer side walls of an insulated range which is shaped to provide an oven compartment 3. The reference character 4 designates the outer top wall of a range and the reference character 5 the inner top wall between which is disposed suitable insulation. The reference character 6 designates the back wall of the oven which is provided with an opening 7 which constitutes an outlet for the products of combustion and which is adapted to be connected with a suitable flue. Arranged within the oven and disposed at opposite sides thereof are a pair of metal plates 8 and 9 which extend from front to rear and from top to bottom of the oven compartment and constitute oven side linings. Each of the oven side linings is shaped in section as shown in Figs. 3 to 6 inclusive and in addition to providing a support for an oven shelf or rack, also serve to hold the insulation in place.

The front and rear portions of each of the oven linings are provided with stamped projecting portions 10 and 11 which are provided with spaced depressed portions or grooves 12 and 13 which are shaped as shown most clearly in Fig. 2. Each of the oven side linings is also provided with a plurality of rows of spaced projections which are pressed or formed from the metal of the walls and so arranged and disposed as to provide a shelf support. These spaced projections are arranged in rows both vertically and horizontally so as to enable the shelf to be inserted into the oven at different heights. These rows of projections are preferably somewhat semicircular in shape. The projections 14 and 15 are so disposed as to be positioned above the shelf when it is inserted within the oven and the projections 16, 17 and 18 are arranged so as to be disposed below the shelf when it is in place within the oven. The space between these two rows of projections is such that the oven rack or shelf will neatly fit therewithin and the projections 14 and 15 on the upper side of the shelf prevent it from tipping or tilting when the shelf 19 is partially removed from the oven or to the position shown in Fig. 2.

It is to be understood that the oven side linings are identical except that one is made to fit the left hand side of the oven and the other is made to fit the right hand side of the oven.

Arranged within the range is an oven burner 20 which is supported in any suitable manner and above which is disposed a plate or pan 21 and which divides the heat compartment into an upper baking compartment or oven and a lower broiling compartment. The oven side linings are held in place by any suitable means such as by being welded or by suitable bolts or brackets attached to or formed as a part of the oven linings. The oven linings may be and preferably are formed in a single stamping operation. There is sufficient metal present in these walls to form these projections without unduly weakening the walls. Another advantage of this construction is that it facilitates the placing of the insulating material between the oven lining and the outside walls of the stove.

It will now be clear that I have provided oven linings for ranges which will accomplish the objects of the invention as hereinbefore stated. It is of course to be understood that various changes may be made in the details of construction as well as in the shape or arrangement of the bosses or projections without departing from the spirit of my invention as the embodiment of the invention herein disclosed is to be considered merely illustrative and not in a limiting sense. The invention obviously is not limited to a gas range but may be used in any compartment where it is desired to provide a suitable shelf support such as in a cabinet or a refrigerator or the like. Therefore, the invention is limited only in accordance with the scope of the appended claims.

Having thus described my invention, what I claim is:

1. In a device of the character described, the combination of a pair of oppositely disposed metal walls secured in rigid spaced relation and adapted to receive and to support a shelf, each of said walls having a plurality of rows of spaced projections pressed therefrom toward the opposite wall and arranged to provide a shelf support, the front and rear portions of said walls each having vertically extending stamped projecting portions also extending toward the opposite wall and having depressed portions therein providing an additional support for said shelf and a shelf supported by said walls.

2. In a device of the character described, the combination of a pair of oppositely disposed metal walls secured in rigid spaced relation and adapted to receive and to support a shelf, each of said walls having a plurality of rows of spaced projections pressed therefrom toward the opposite wall and arranged to provide a shelf support, the front and rear portions of said walls each having vertically extending stamped projecting portions also extending toward the opposite wall and having depressed portions therein providing an additional support for said shelf, said projections and depressed portions being disposed and arranged so as to prevent tilting of said shelf when partially removed, and a shelf supported by said walls.

3. In a device of the character described, the combination of a pair of sheet metal walls rigidly held in opposed relation to each other, each of said walls having a plurality of rows of bosses pressed therefrom toward the opposite wall without breaking the metal thereof, such bosses being arranged in rows in staggered relation so as to provide a shelf support, a slidable shelf resting on alternate bosses and held down by adjacent bosses and guiding means formed integral with said side walls respectively for directing said shelf between said rows of bosses.

4. In a device of the character described, the combination of a pair of sheet metal walls rigidly held in opposed relation to each other, each of said walls having a plurality of rows of bosses pressed therefrom toward the opposite wall without breaking the metal thereof, such bosses being arranged in rows in staggered relation so as to provide a shelf support, a slidable shelf resting on alternate bosses and held down by adjacent bosses and guiding means formed integral with said side walls respectively for directing said shelf between said rows of bosses, each of said bosses being semi-spherical in shape and having a flattened portion disposed adjacent and in offset relation to the flattened portion of an adjacent boss.

5. In a device of the character described, the combination of a pair of oppositely disposed sheet metal walls secured in rigid spaced relation and adapted to receive and support a shelf, each of said walls having a plurality of bosses drawn therefrom toward the opposite walls without breaking the metal thereof and arranged to provide a shelf support, a shelf supported by said bosses, said bosses being disposed so as to engage both the upper side and the underside of said shelf to prevent tilting thereof when the shelf is partially removed, the bosses which engage the upper side of said shelf being disposed between and in offset relation to the bosses which engage the underside thereof.

JOHN G. HOFF.